United States Patent
Shimura et al.

(10) Patent No.: US 7,424,097 B2
(45) Date of Patent: Sep. 9, 2008

(54) METHOD OF MEASURING AND IMPROVING XDSL TRANSMISSION CHARACTERISTIC

(75) Inventors: Toshiya Shimura, Tokyo (JP); Minoru Sudo, Tokyo (JP)

(73) Assignee: NEC Corporation, Tokyo (JP)

( * ) Notice: Subject to any disclaimer, the term of this patent is extended or adjusted under 35 U.S.C. 154(b) by 627 days.

(21) Appl. No.: 09/973,762

(22) Filed: Oct. 11, 2001

(65) Prior Publication Data

US 2002/0041656 A1  Apr. 11, 2002

(30) Foreign Application Priority Data

Oct. 11, 2000  (JP)  ............... 2000-311045

(51) Int. Cl.
    *H04M 1/24* (2006.01)
(52) U.S. Cl. .................. 379/1.04; 379/1.01; 379/27.01; 379/28; 379/29.01
(58) Field of Classification Search .............. 379/1.04, 379/1.01, 27.01, 28, 29.01, 406.08; 375/219, 375/230, 260, 296, 341, 346; 370/480, 201, 370/210, 286
    See application file for complete search history.

(56) References Cited

U.S. PATENT DOCUMENTS

| | | | |
|---|---|---|---|
| 5,615,225 A | | 3/1997 | Foster et al. |
| 5,731,706 A | * | 3/1998 | Koeman et al. ............. 324/628 |
| 5,808,463 A | * | 9/1998 | Nagano ................... 324/76.21 |
| 6,014,425 A | | 1/2000 | Bingel et al. |
| 6,091,713 A | | 7/2000 | Lechleider et al. |
| 6,229,855 B1 | * | 5/2001 | Takatori et al. ............. 375/296 |
| 6,341,159 B1 | * | 1/2002 | Jollota ..................... 379/22.03 |
| 6,453,015 B1 | * | 9/2002 | Benedict et al. .......... 379/27.01 |
| 2002/0041565 A1 | * | 4/2002 | Valenti et al. ............... 370/201 |

FOREIGN PATENT DOCUMENTS

| | | |
|---|---|---|
| EP | 0 859 473 | 8/1998 |
| JP | 2000-209338 | 7/2000 |
| WO | WO 99/53637 | 10/1999 |
| WO | WO 00/27134 | 5/2000 |
| WO | WO 00/35133 | 6/2000 |
| WO | WO 00/41331 | 7/2000 |

OTHER PUBLICATIONS

"A Spectrum Analyzer for the Radio Amateur", by Wes Hayward and Terry White, dated Aug. 1998.*
Ziemann, P.: "ADSL line qualification tests" Application Note 52, Sep. 28, 2000, pp. 1-5.

* cited by examiner

*Primary Examiner*—Barry W Taylor
(74) *Attorney, Agent, or Firm*—Young & Thompson

(57) ABSTRACT

A system for measuring the transmission characteristic of an xDSL system that implements high-speed data communication over existing copper telephone wires connecting an office and a subscriber includes a polling device included in the outside line of an xDSL circuit, which is installed in an office, for polling a subscriber line. A noise level measuring circuit measures the existing level of cross-talk noise on the subscriber line. A decision circuit determines, based on the existing level of cross-talk noise measured, whether or not the subscriber line is usable.

15 Claims, 2 Drawing Sheets

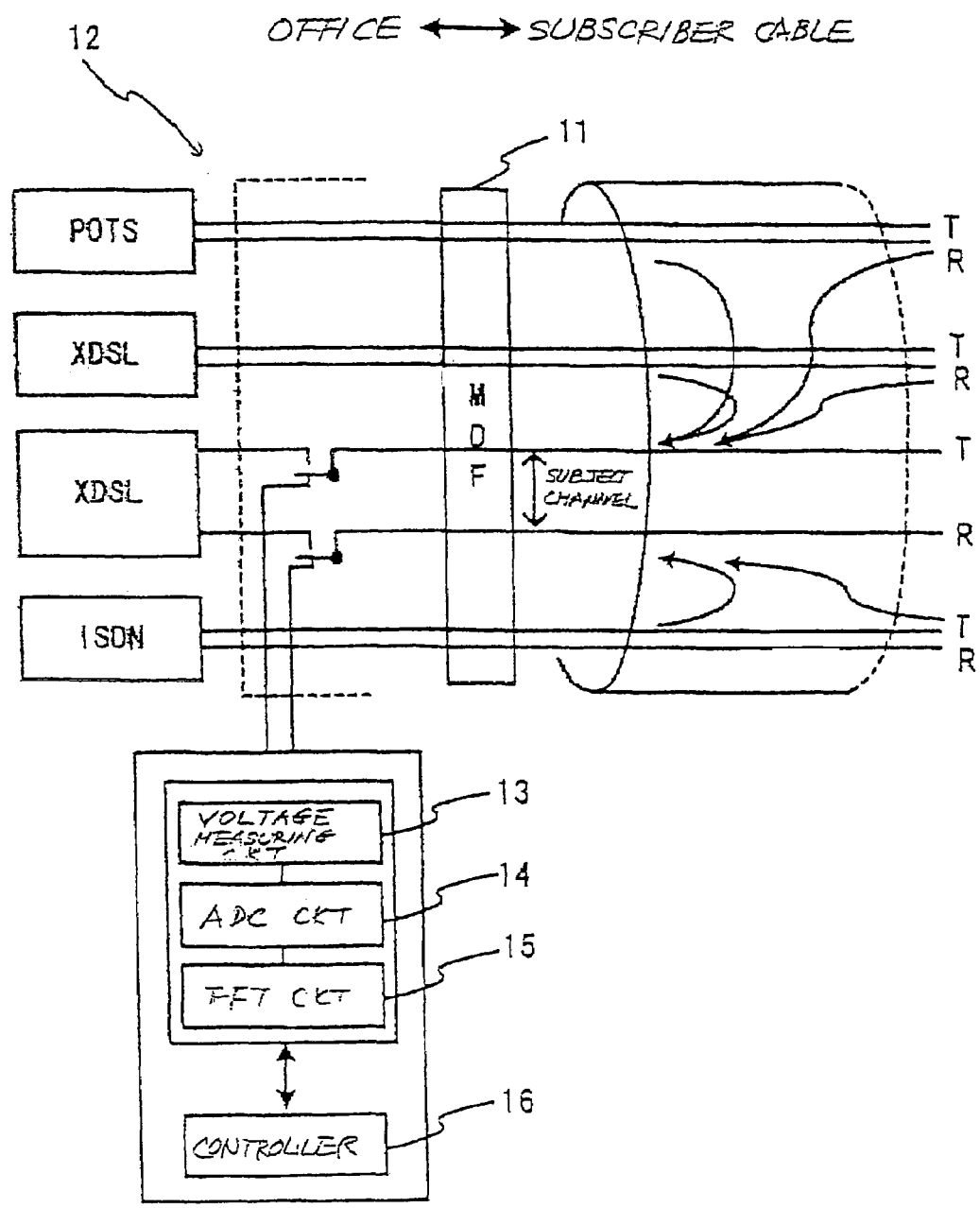

US 7,424,097 B2

METHOD OF MEASURING AND IMPROVING XDSL TRANSMISSION CHARACTERISTIC

BACKGROUND OF THE INVENTION

1. Field of the Invention

The present invention relates to a method of improving the transmission characteristics of xDSL (x Digital Subscriber Line) system that effects high-speed data communication over existing telephone lines implemented by copper wires and connecting an office and subscribers and a method of measuring the transmission characteristics and more particularly to a measure against cross-talk noise on xDSL channels.

2. Description of the Background Art

The characteristics of xDSL channels deteriorate due to cross-talk ascribable to high-speed transmission relying on metallic cables, as has been pointed out in the past. A measure against cross-talk noise is particularly essential with an xDSL system in which cross talk ascribable to an ISDN (Integrated Services Digital Network) occurs in an xDSL transmission frequency band.

Generally, frequency bands assigned to xDSL systems partly overlap each other and frequency bands assigned to other high-speed communication systems including a TCM-ISDN (Time Compression Multiplexing-ISDN) system. The characteristics of each xDSL system therefore deteriorates due to cross-talk noise introduced from the other high-speed communication systems. In light of this, it has been proposed to confirm the characteristics of an xDSL channel via confirming means that faces a terminated device at the subscriber side of a subscriber line, which accommodates an xDSL subscriber, thereby selecting a channel suffering from a minimum of cross talk. Japanese Patent Laid-Open Publication Nos. 10-303872 and 2000-32096, for example, each propose to reduce cross talk by causing an xDSL channel to operate in synchronism with a TCM-ISDN transmission/receipt window.

The confirming means, however, needs a considerable period of time for selecting a channel suffering from a minimum of cross talk. The synchronous operation scheme taught in the above Laid-Open Publications applies TCM to existing xDSL systems directed toward full-duplex data transmission. This kind of scheme is therefore not practicable without changing the xDSL transmission system itself.

SUMMARY OF THE INVENTION

It is an object of the present invention to provide a method of measuring and improving an xDSL transmission characteristic allowing xDSL channels to be selectively used and easily confirming the characteristics of the individual xDSL channel without resorting to any change or modification of the xDSL transmission system.

In accordance with the present invention, in a method of improving the transmission characteristic of an xDSL system that implements high-speed data communication over existing copper wires connecting an office and a subscriber, a testing system installed in an office polls, before the connection of a subscriber line to the xDSL system, the subscriber line at the outside line of an xDSL circuit, measures the cross-talk noise characteristic of the subscriber line, and prevents, if the cross-talk noise characteristic is of high level, the subscriber line from being connected to the xDSL circuit.

Also, in accordance with the present invention, a system for measuring the transmission characteristic of an xDSL system that implements high-speed data communication over existing copper wires connecting an office and a subscriber includes a polling device included in the outside line of an xDSL circuit, which is installed in an office, for polling a subscriber line. A noise level measuring circuit measures the level of cross-talk noise on the subscriber line. A decision circuit determines, based on the level of cross-talk noise measured, whether or not the subscriber line is usable.

BRIEF DESCRIPTION OF THE DRAWINGS

The above and other objects, features and advantages of the present invention will become more apparent from the following detailed description taken with the accompanying drawings in which:

FIG. 2 is a block diagram schematically showing a system for selecting a low noise level, xDSL channel embodying the present invention.

DESCRIPTION OF THE PREFERRED EMBODIMENT

Figure 1:
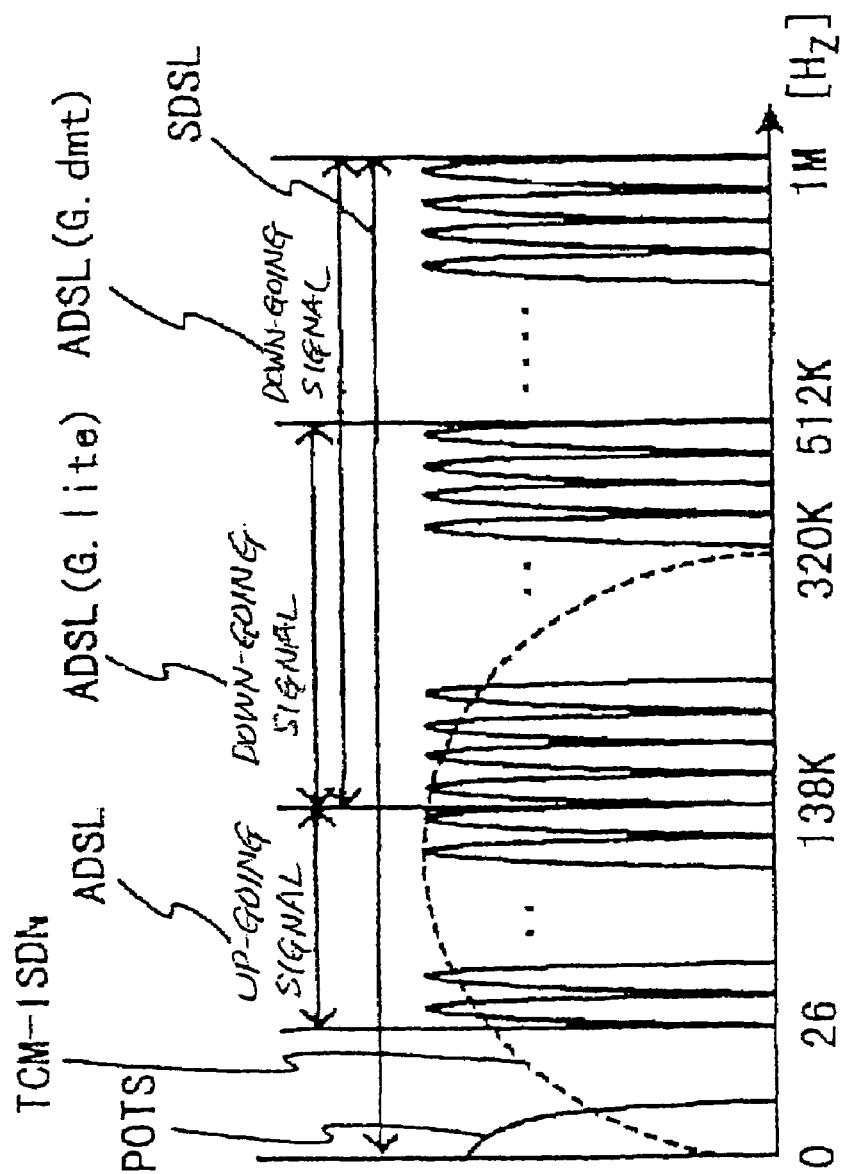
FIG. 1 shows specific frequency bands assigned to a DMT (Direct Multi-Tone) xDSL system and other communication systems.

FIG. 1 shows frequency bands assigned to a DMT xDSL system, an ADSL (Asynchronous Digital Subscriber Line) system, and an SDSL (Symmetric Digital Subscriber Line) system. As shown, the xDSL systems use frequency bands overlapping each other as well as frequency bands assigned to the other high-speed communication systems. As a result, the characteristic of each xDSL channel deteriorates due to cross-talk noise ascribable to TCM-ISDN channels and other xDSL channels. While some measures against such cross-talk noise have been proposed in the past, they each bring about another problem to be solved, as discussed earlier.

Referring to FIG. 2, a system for selecting an xDSL channel suffering from a minimum of cross-talk noise embodying the present invention will be described. As shown, the system includes an MDF (Main Distribution Frame) 11 connected to outside line terminals T and R at the subscriber side. Relays 12 implement test drops and deliver noise voltages on xDSL channels to a testing system. The testing system is made up of a voltage measuring circuit 13, an ADC (Analog-to-Digital Converter) circuit 14, an FFT (Fast Fourier Transform) circuit 15, and a controller 16. The voltage measuring circuit 13 measures the noise voltages delivered from the test-drop relays 12. The ADC circuit 14 converts the measured voltages to digital signals. The FFT circuit 15 executes FFT with the digital signals. The controller 16 determines whether or not the individual xDSL channel is usable.

In operation, a cross-talk noise level on the outside line terminals T and R at the subscriber side is differentially input to the testing system via the MDF 11 and test-drop relays 12 in the form of an AC voltage between wires. In the testing system, the voltage measuring circuit 13 has a function of amplifying the level of an input signal. The voltage measuring circuit 13 amplifies the cross-talk noise voltage and then feeds the amplified noise voltage to the ADC circuit 14.

The ADC circuit 14 converts the noise voltage to a digital signal by using a preselected sampling frequency and feeds the digital signal to the FFT circuit 15. The FFT circuit 15 transforms the digital signal to noise spectrum data by FFT. The controller 16 compares the noise spectrum data with a template, which is weighted at a subject frequency, to thereby determine whether or not the channel is usable.

More specifically, the controller 16 makes the above decision while controlling the voltage measuring circuit 13, ADC circuit 14 and FFT 15. If the result of decision shows that deterioration is estimated in the characteristic of the xDSL channel, then the controller 16 selects another channel whose characteristic is not deteriorated. This is successful to improve the transmission characteristic of the entire xDSL system.

As stated above, the illustrative embodiment pays attention to the fact that the frequency bands of various xDSL systems partly overlap each other, as shown in FIG. 1. Before connection of a subscriber line to the xDSL system, the testing system installed in an office polls the subscriber line via the relays 12 connected to the outside line of an xDSL channel. The testing system then measures a noise level on the subscriber line, i.e., a crosstalk noise characteristic in the overlapping frequency range.

Subsequently, the measured noise level is compared with the template in order to determine whether or not the xDSL channel is qualified for connection to the subscriber line as to the deterioration of characteristic. This prevents the subscriber line from being connected to channel estimated to deteriorate.

More specifically, noise generated in an ISDN system and other xDSL systems due to cross talk are introduced into subscriber lines using the xDSL system, deteriorating the characteristic of the subscriber lines. In the illustrative embodiment, before a subscriber line is connected to the xDSL system, the testing system pulls the outside line at the subscriber side via the relays 12. The voltage measuring circuit 13 differentially determines an AC voltage between the wires of the outside line. The ADC circuit 14 transforms the AC voltage to a digital signal having a preselected sampling rate.

The FFT circuit 15 transforms the digital signal to noise spectrum data by FFT to thereby measure noise level of the subject port. The controller 16 compares the measured noise level and template, or threshold, in order to determine whether or not the xDSL channel is qualified for connection to the subscriber line as to the deterioration of characteristics. If the xDSL channel is not qualified, then the controller 116 does not connect the subscriber line to the xDSL channel. It is to be noted that the template is prepared on the basis of experimental data beforehand by paying attention to a frequency band in which deterioration is noticeable.

In summary, in accordance with the present invention, a testing system installed in an office measures the noise level of a subject port before a subscriber line is connected to an xDSL channel. The testing system can therefore determine the condition of the subscriber line in a short period of time. Further, whether or not to connect the subscriber line to the xDSL channel can be determined by a relatively simple configuration on the basis of estimated deterioration. This successfully avoids the deterioration of characteristic ascribable to cross-talk noise beforehand.

Various modifications will become possible for those skilled in the art after receiving the teachings of the present disclosure without departing from the scope thereof.

What is claimed is:

1. A method of improving a transmission characteristic of an xDSL system that implements high-speed data communication over existing copper telephone line wires connecting a telephone office and a subscriber, comprising the steps of:

using a testing system installed in a telephone office proximate a main distribution frame polls, before connection of a subscriber telephone line to said xDSL system, said subscriber telephone line at an outside line of an xDSL circuit, to measure a cross-talk noise characteristic of said subscriber telephone line only within an xDSL transmission frequency band, and if said cross-talk noise characteristic is of high level, preventing said subscriber telephone line from being connected to said xDSL circuit, wherein the measured cross-talk characteristic is cross-talk existing on the subscriber telephone line due to interference from other subscriber telephone lines within the xDSL transmission frequency band.

2. The method as claimed in claim 1, wherein said testing system transforms a level of cross-talk noise on the subscriber telephone line to noise spectrum data by FFT (Fast Fourier Transform) and compares said noise spectrum data with a template for noise level decision, which is weighted at a subject frequency, to thereby determine whether or not said subscriber telephone line is usable, only within a frequency band for Direct Multi-Tone xDSL use, said measurement of the cross-talk is made without injecting a test signal onto the subscriber telephone line under test.

3. The method of claim 1, wherein the measured cross-talk characteristic is a cross-talk existing on the subscriber telephone line ascribable to interference from Integrated Services Digital Network.

4. A system for measuring a transmission characteristic of an xDSL system that implements high-speed data communication over existing copper telephone line wires connecting a telephone office and a subscriber, said system comprising:

polling means included in an outside telephone line of an xDSL circuit installed in an office for polling a subscriber telephone line;

noise level measuring means for measuring an existing level of cross-talk noise on the subscriber line limited to an xDSL transmission frequency band; and decision means for determining, based on the level of cross-talk noise measured, whether or not the subscriber line is usable within the frequency range delimited by xDSL use.

5. The system as claimed in claim 4, wherein said polling means comprises:

an MDF (Main Distribution Frame) connected to terminals T and R of the outside line at a subscriber side; and relays connected to said MDF and connecting the terminals T and R to test terminals.

6. The system as claimed in claim 5, wherein said noise level measuring means comprises:

a voltage measuring circuit for measuring an existing cross-talk noise voltage input via said relays;

an ADC (Analog-to-Digital Converter) circuit for converting cross-talk noise voltage measured to a digital signal; and an FFT (Fast Fourier Transform) circuit for transforming the digital signal to noise spectrum data.

7. The system as claimed in claim 6, wherein said decision means comprises means for comparing the noise spectrum data with a template for noise level decision to thereby determining whether or not the subscriber line is usable within a frequency range for Direct Multi-Tone xDSL use.

8. The system as claimed in claim 4, wherein said noise level measuring means comprises:

a voltage measuring circuit for measuring an existing cross-talk noise voltage input via said relays;

an ADC (Analog-to-Digital Converter) circuit for converting cross-talk noise voltage measured to a digital signal; and an FFT (Fast Fourier Transform) circuit for transforming the digital signal to noise spectrum data.

9. The system as claimed in claim 8, wherein said decision means comprises means for comparing the noise spectrum data with a template for noise level decision to thereby determining whether or not the subscriber line is usable within a frequency range for xDSL use.

10. The system of claim 4, wherein, the noise level measuring means for measuring an existing level of cross-talk noise on the subscriber line operates only above POTS frequencies.

11. The system of claim 4, wherein, the noise level measuring means for measuring an existing level of cross-talk noise on the subscriber line operates only above POTS frequencies.

12. A system for measuring a transmission characteristic of an xDSL system that implements high-speed data communication over existing copper telephone line wires connecting a telephone office and a subscriber, said system comprising:
  polling means included in an outside telephone line of an xDSL circuit installed in an office for polling a subscriber telephone line;
  noise level measuring means for measuring an existing level of cross-talk noise on the subscriber line ascribable to first digital signal cross-talk noise within an overlapping frequency range of a first xDSL channel under test; and
  decision means for determining, based on the level of cross-talk noise measured, whether or not the first xDSL channel under test on the subscriber line is usable for XDSL transmission use, wherein,
  said polling means comprises an MDF (Main Distribution Frame) connected to terminals T and R of the outside line at a subscriber side, and relays connected to said MDF and connecting the terminals T and R to test terminals, and
  said noise level measuring means comprises a voltage measuring circuit for measuring an existing cross-talk noise voltage input via said relays, an ADC (Analog-to-Digital Converter) circuit for converting cross-talk noise voltage measured to a digital signal, and an FFT (Fast Fourier Transform) circuit for transforming the digital signal to noise spectrum data.

13. The system of claim 12, wherein the first digital signal cross-talk noise is ascribable to an Integrated Service Digital Network signal.

14. The system of claim 12, wherein the first digital signal cross-talk noise is ascribable at least a second xDSL channel.

15. The system of claim 12, wherein,
  the first digital signal cross-talk noise is ascribable to at least one of an Integrated Service Digital Network signal and a second xDSL channel.

* * * * *